INVENTOR.
Harold A. Price

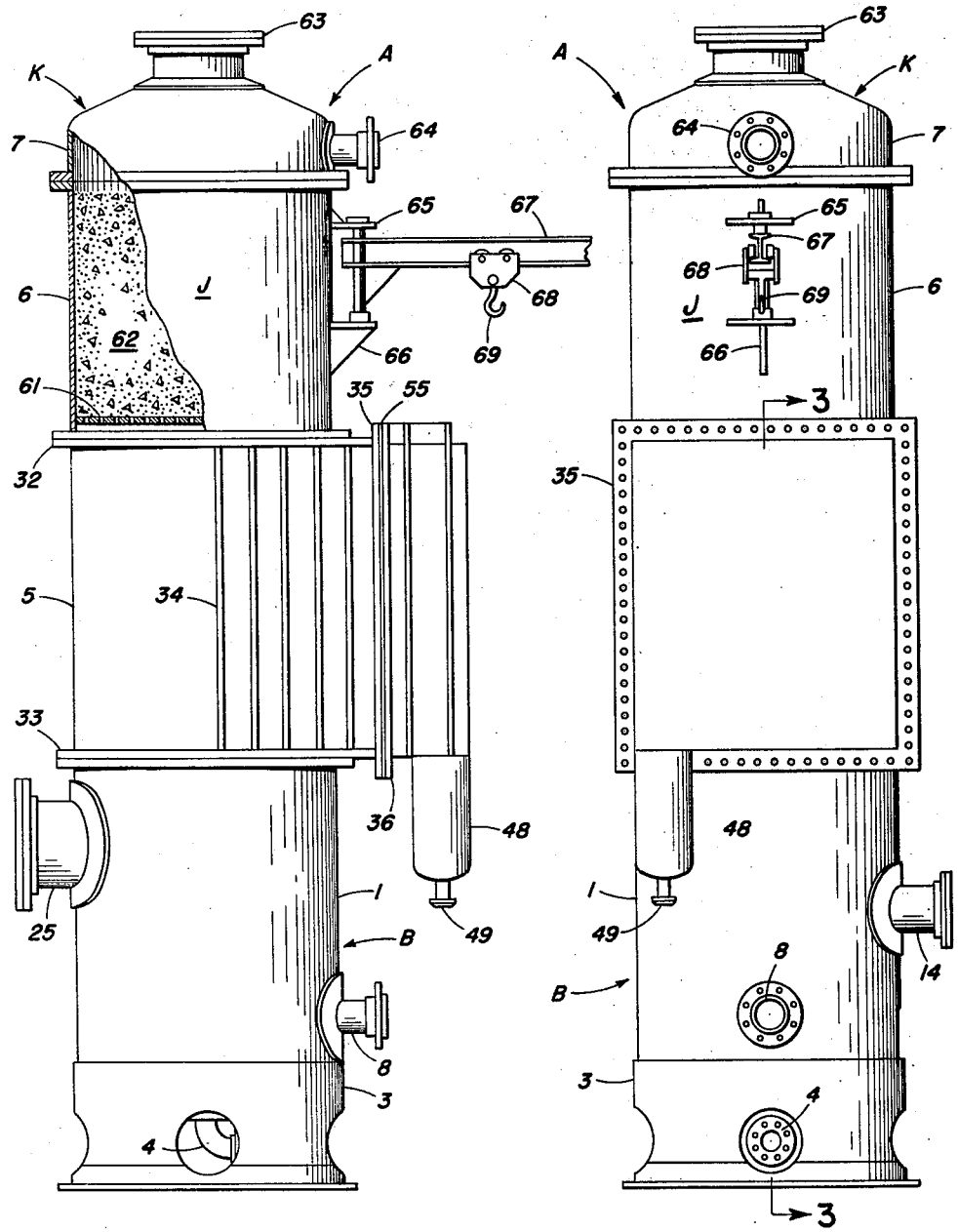

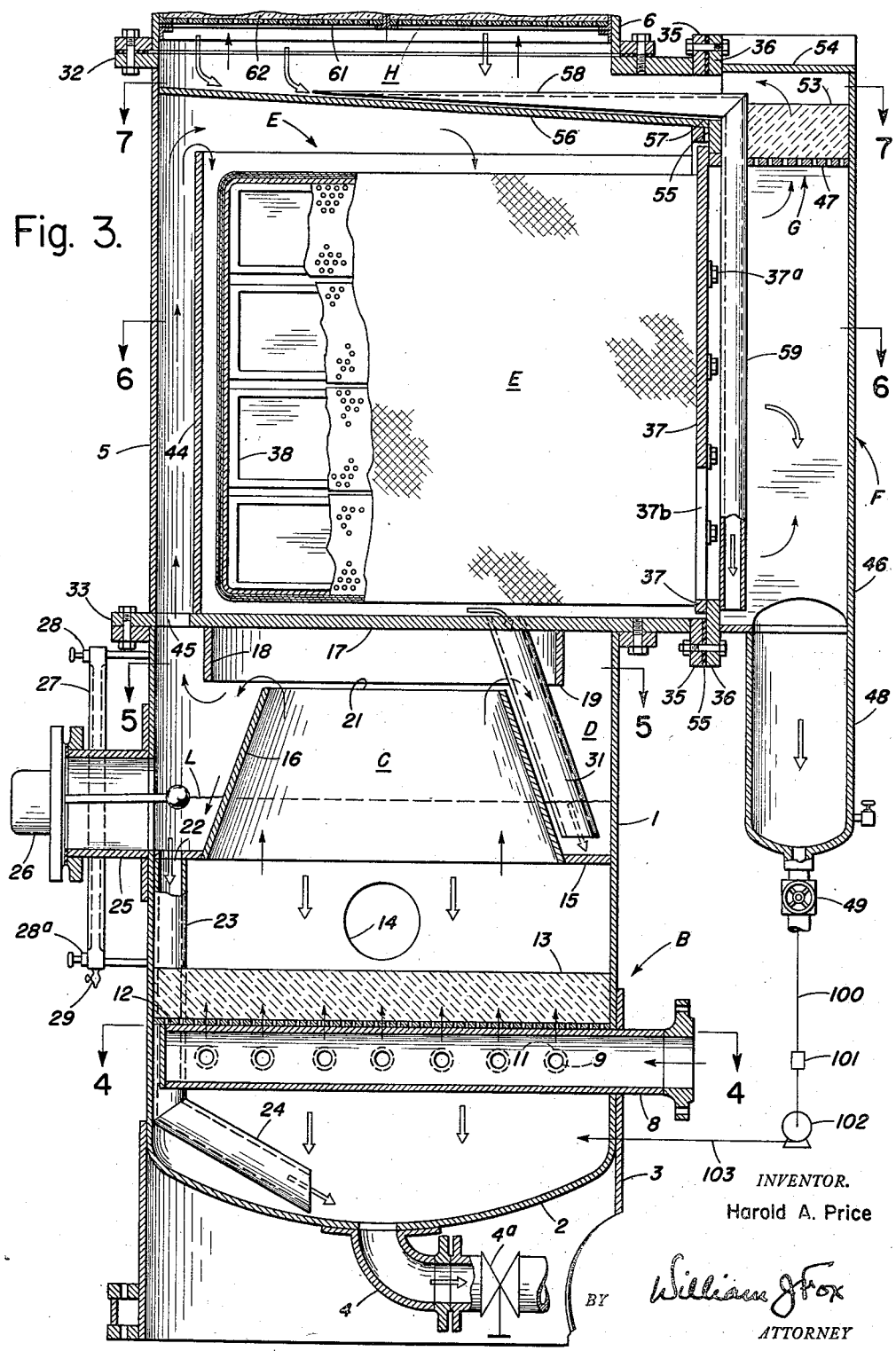

ATTORNEY

Jan. 26, 1960
H. A. PRICE
2,922,750
APPARATUS FOR WATER, WAX, GUM AND DIRT REMOVAL FROM HYDROCARBONS
Filed Feb. 15, 1955
5 Sheets-Sheet 4
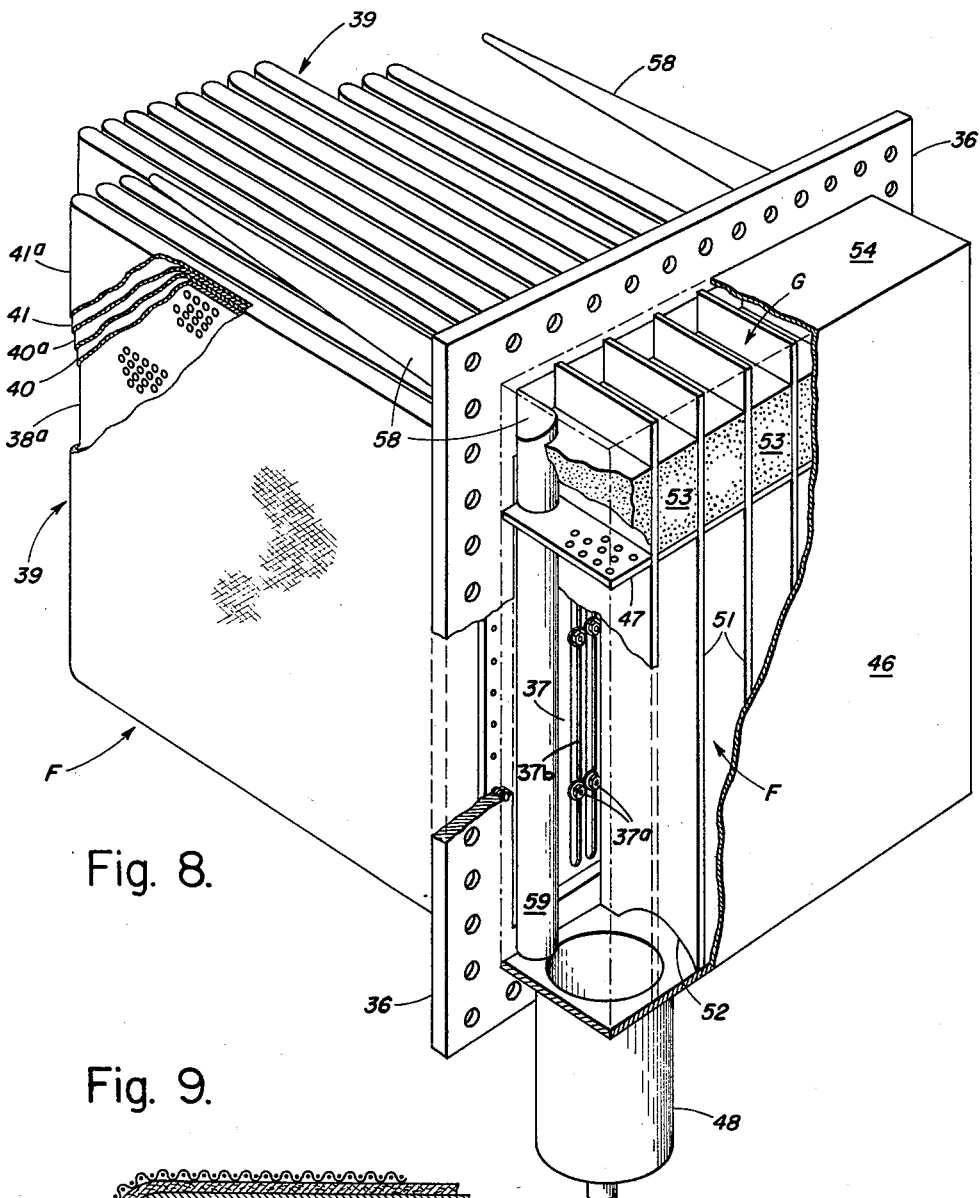
Fig. 8.
Fig. 9.
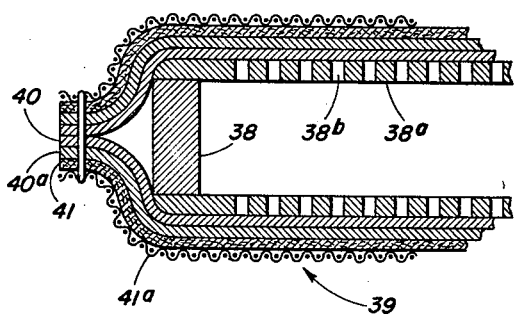
INVENTOR.
Harold A. Price
BY William J. Fox
ATTORNEY

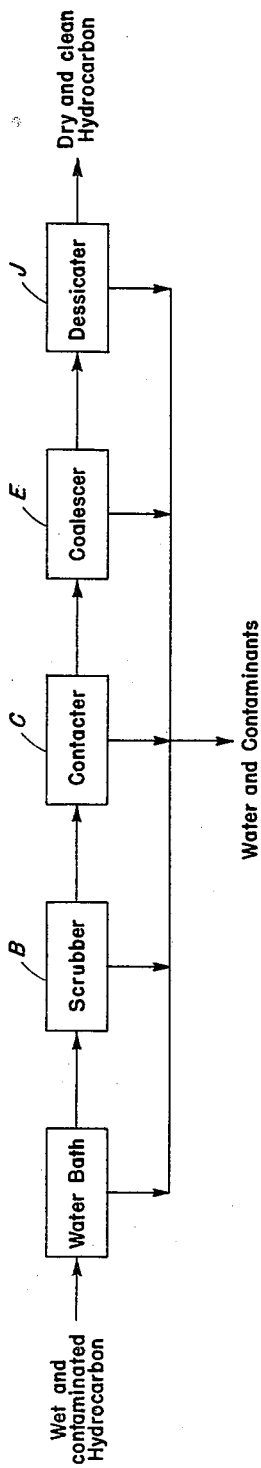
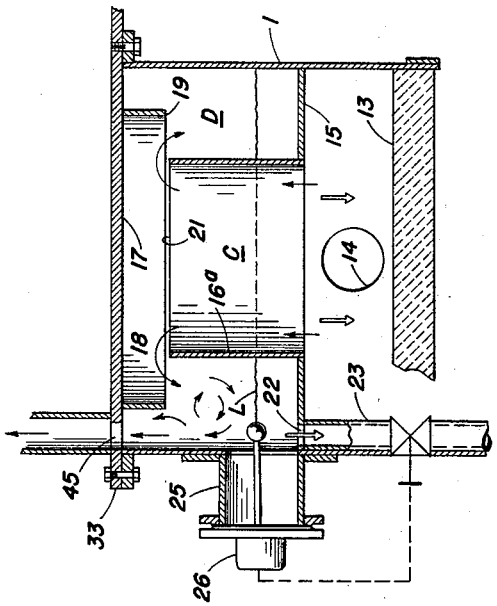
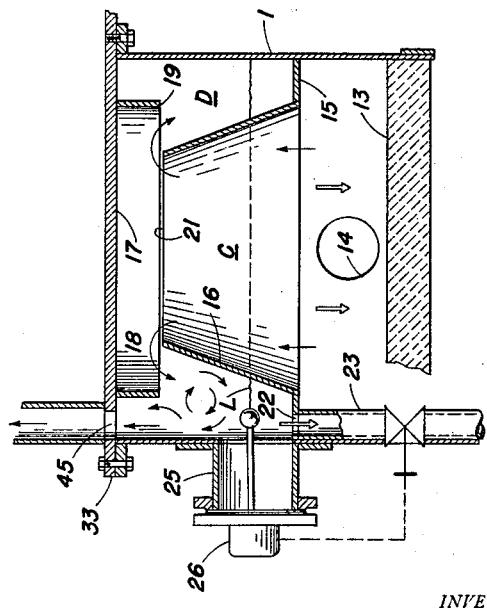

United States Patent Office 2,922,750
Patented Jan. 26, 1960

2,922,750

APPARATUS FOR WATER, WAX, GUM AND DIRT REMOVAL FROM HYDROCARBONS

Harold Arnold Price, Lafayette, Calif., assignor to Dorr-Oliver Incorporated, Stamford, Conn., a corporation of Delaware Application February 15, 1955, Serial No. 488,265

5 Claims. (Cl. 196—46.1)

This invention relates to and in general has for its object the provision of a process and an apparatus for rectifying hydrocarbons, that is, for breaking the emulsions existent thereof, coalescing its water content and progressively effecting a separation of hydrocarbon, waxes, gums, water and dirt components thereof so as to produce a substantial water-, wax-, gum-, and dirt-free hydrocarbon.

At various stages in oil field operations, in the production of crude oils, and in the refining, storage and transportation thereof, hydrocarbons become contaminated with water, waxes, gums, dirt and other foreign matter injurious to the processing and dispensing equipment, injurious to the final equipment in which such hydrocarbons are used, and in many instances materially decreasing the efficiency of such equipment.

The inclusion of water and its various solutions in hydrocarbons of course results in the corrosion of the equipment with which it comes in contact, its dirt and other foreign matter abrades such equipment, and when the hydrocarbon in question is used as a fuel, its water content decreases its efficiency.

Although not generally known to the lay public, refined petroleum products as presently dispensed to the consumer contain appreciable amounts of water, waxes, gums, dirt and other foreign matter in spite of all of the precautions taken to remove these elements during the refining thereof. Water becomes entrained in the refined petroleum products by contact with the atmosphere, and as a result of the sweating of the tanks in which it is stored for subsequent delivery to the consumer or in the service station tanks. Another source of water and contamination results from the fact that on their return trips, tankers have to be ballasted with water and are not completely freed of water and contamination before being refilled for a subsequent outgoing trip. Foreign matter becomes entrained in the petroleum products as a result of the storage thereof in steel tanks, or as a result of passing through steel lines and pumps. Such foreign matter may include undissolved salts and metallic oxides. Dirt can enter the system at various points and may include sand. Slight changes in pH also cause different types of scale formations which find their way into the liquid.

In summary, this invention proposes to remove the liquid and solid contaminants by providing a progressive stage-wise treatment of the hydrocarbon, with its contaminants, in order to effect a substantially complete removal. It is the concept of this invention to remove first the larger particles that will settle by gravity or that will coalesce without special treatment, then to pass the hydrocarbon through a further treatment zone to coalesce and enlarge the smaller particles, and to repeat this operation until substantially all of the contaminants have been removed.

In the treatment of hydrocarbons, it has now been discovered that many of the solid particles, principally comprising waxes and gums, formed about a nucleus of a tiny iron oxide or rust particle, may be scrubbed by passing through a specially designed scrubbing bed to be hereinafter described in detail. The particles coming from the scrubbing bed apparently have sticky surfaces such that when they are contacted they adhere and form into larger particles, usually with a long hairlike structure.

It has also been found that coalescing of the liquids and agglomeration or contacting of the solids into larger particles can be accomplished by passing these contaminants through an orifice of restricted size so that they are subjected to a substantial change in both pressure and velocity. This may be accomplished either by passing the hydrocarbon through a Venturi-like opening or by passing it through a sharply baffled zone.

In addition to the above, this invention also comprises a particular apparatus combining several of the foregoing into a unitary structure in order to provide a piece of equipment adapted for the substantially complete treatment of these hydrocarbons.

These various factors have been discussed in some detail in part to assist the reader in gaining a better appreciation of the method and apparatus here involved, and the equivalent variations thereof which can be made in order to treat various hydrocarbons of different characteristics.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or of equivalents of such metes and bounds, are therefore intended to be embraced by those claims.

Referring to the drawings, which show one method of performing the process—

Fig. 1 is a side elevation of a rectifier embodying the objects of the invention.

Fig. 1a is an idealized flowsheet showing the successive treatment zones for stage-wise removal of contaminants.

Fig. 2 is a front elevation of the rectifier illustrated in Fig. 1.

Fig. 3 is an enlarged vertical mid-section taken on the section line 3—3 of Fig. 2 but with the upper dome of the rectifier broken away.

Fig. 8 is an isometric drawing of coalescing and filtering subassembly shown in vertical section in the upper half of Fig. 3.

Fig. 9 is a fragmentary vertical section taken through one of the filtering and coalescing units of the filtering and coalescing subassembly.

Fig. 10 is a vertical cross-sectional view of a preferred type of contacting unit.

Fig. 11 is a vertical cross-sectional view of another type of contacting unit.

Figure 7:
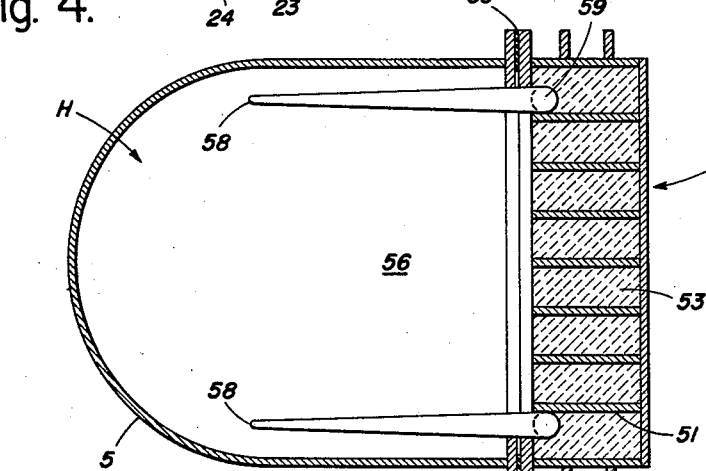
Fig. 7 is a reduced horizontal section taken on the section line 7—7 of Fig. 3.
Figure 6:
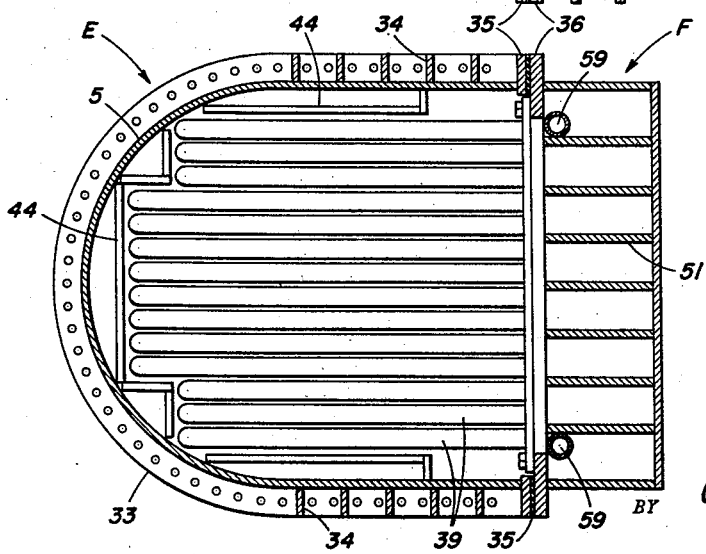
Fig. 6 is a reduced horizontal section taken on the section line 6—6 of Fig. 3.

Broadly viewed, the preferred embodiment of the rectifier illustrated in these various figures includes a cylindrical column generally indicated by the letter A, Figs. 1 and 2, provided with a scrubber subassembly generally indicated by the letter B, Figs. 1 2 and 3; a hydraulic contacter generally designated by the letter C, Figs. 3, 5, 10 and 11; a quiescent settling chamber generally designated by the letter D, Figs. 3, 5, 10 and 11; a filtering and coalescing subassembly communicating with the settling chamber D and generally designated by the letter E, Figs. 3, 6 and 8; a quiescent settling chamber arranged to receive coalesced filtrate from the subassembly E and generally designated by the letter F, Figs. 3, 6 and 8; a second scrubber disposed over the upper end of the subassembly F and generally designated by the letter G, Figs. 3, 7 and 8; a second quiescent settling chamber generally designated by the letter H, Fig. 3; a desiccator generally designated by the letter J, Figs. 1 and 2, and a hydraulic shock absorber disposed over the desiccator H and generally designated by the letter K, Figs. 1 and 2.

From an inspection of Fig. 3 using this method of construction, it will be seen that generally each of these subassemblies is so disposed with respect to the preceding unit that a gravity separation of the respective phases of the material being treated can take place as the material progresses through the unit. Also it is to be noted that this relationship of subassemblies can be maintained without the necessity of incorporating them as integral parts of a single column.

Column A

As best shown in Figs. 1, 2 and 3, the column A includes a lower cylindrical section 1 provided with a dished bottom 2 and supported on a cylindrical base 3 welded thereto. Welded to the dished bottom 2 is a solids and water outlet fitting 4. Bolted to the upper end of the cylinder 1 is an intermediate section 5, U-shape in horizontal section as shown in Figs. 6 and 7. Mounted on and secured to the upper end of the section 5 is an upper cylindrical section 6, and bolted to the upper end thereof is a dome 7.

Scrubber B

Figure 4:
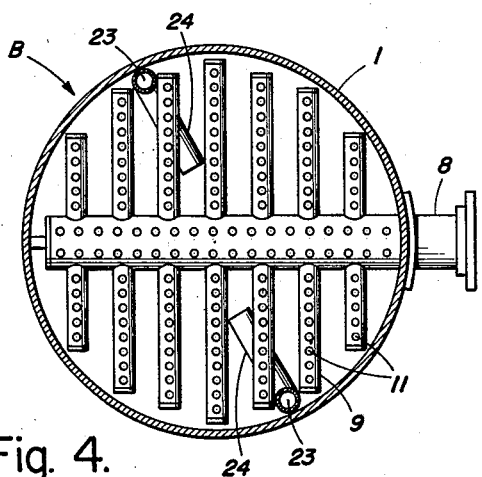
Fig. 4 is a reduced horizontal section taken on the section line 4—4 of Fig. 3.
Figure 5:
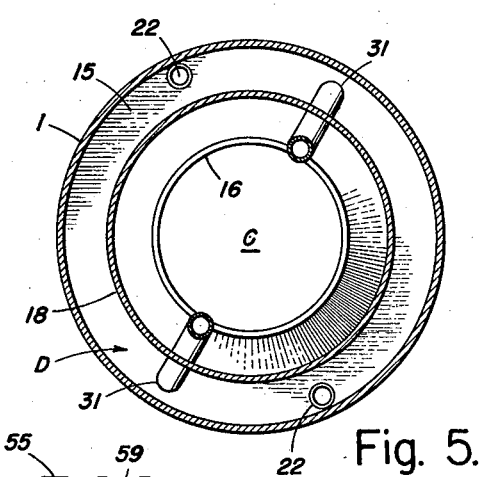
Fig. 5 is a reduced horizontal section taken on the section line 5—5 of Fig. 3.

As best shown in Fig. 3 the scrubber B includes a feed header 8 extending through and secured to the cylinder 1. Welded to the header 8 are transverse pipes 9, the header 8 and the pipes 9 being provided with upwardly directed outlets 11 best seen in Fig. 4. Resting on the pipes 9 and arched over the header 8 is a perforated screen 12 and supported thereon is a layer or body 13 of tower packing functioning to cause working, scrubbing, distention, distortion, etc., of the bubble and the solids and using, for example, ¾" Intalox packing Berl saddles or Raschig rings, all of which are available on the market. Connected to the side of the cylinder immediately above the level of the tower packing is a flanged pipe 14. This entire portion of the unit operates completely immersed in water.

The packing should normally be between 6 and 12 inches in depth for maximum effectiveness, but will vary for different hydrocarbon feeds. If the packing is too deep it will present too much resistance to the flow of hydrocarbon through it and the hydrocarbon will back up underneath the plate forming a solid body of hydrocarbon extending across the vessel. On the other hand, if the bed is not deep enough, then the full value of its scrubbing action will not be realized. The liquid flowing from the outlets 11 should pass upwardly at a slow rate in order that any bubbles that have formed be permitted to remain in this condition and not be disintegrated due to the velocity of the liquid. The outlets 11 are shown extending in an upwardly direction but they could just as well be operated in a horizontally or downwardly-directed position. In cold climates where there is danger that the water layer might freeze, immersion heaters may be used in this portion of the bath. The large volume of the bath acts as an excellent heat reservoir, able to handle fluctuations in feed with only a modestly sized heater. It is important that no ice crystals find their way to the filtering subassembly E lest they blind it.

Hydraulic contacter C

The hydraulic contacter subassembly C, as shown in Figs. 3, 10 and 11, is formed integral with the cylinder 1 and includes a ring 15 welded to the interior of the cylinder 1 and a truncated cone 16 (Figs. 3 and 10) welded at its lower end to the inner edge of the ring 15. Bolted to the upper flanged end of the cylinder 1 is a partition wall 17 closing off the upper end of the cylinder 1 and serving as the floor or bottom of the coalescing and filtering subassembly E to be presently described in greater detail. Depending from the partition wall 17 and welded thereto coaxially with the truncated cone 16 is a baffle ring 18, the lower edge 19 of this ring being at substantially the level of the upper edge 21 of the truncated cone 16. In place of the truncated cone 16, any device may be used that will produce a reasonably rapid change in velocity and pressure of the liquid passing through. In Fig. 11, there is shown a cylinder 16a which has been demonstrated as producing the same results as the truncated cone 16, although not as efficiently.

Settling Chamber D

From an inspection of Fig. 3 it will be seen that the settling chamber D is defined by the walls of the cylinder 1, the ring 15, the truncated cone 16, the partition wall 17 and the depending ring 19. Formed in the ring 15 are a plurality of peripherally spaced holes 22 and communicating with each of these holes is a pipe 23 extending downwardly through the layer 13 of tower packing to a point below the header 8. Welded to the lower end of each of the pipes 23 is a pipe section 24 extending downwardly and inwardly to a point adjacent the intake of the fitting 4.

Communicating with the chamber D and sealed to the cylinder 1 immediately above the ring 15 is a cylindrical chamber 25 for accommodating an automatic float operated interface control 26. The automatic float operative control floats on the surface of the water (level L) present in the vessel and in this embodiment either opens or closes valve 4a to maintain the water level at a constant position. The manner of controlling the valve is not shown, but it may be performed by any of the standard automatic devices for this control or may be done by a suitable mechanical linkage.

In closed circuit with the upper end of the chamber D and the lower end of the hydraulic contactor C is a sight glass 27 provided at its upper end with a valve 28 and at its lower end with a pet cock 29, and a valve 28a.

Secured to and extending through the partition 17 is a plurality of circularly spaced inclined conduits 31 communicating with the lower ends of the settling chamber D, the lower ends of these conduits preferably being laterally offset with respect to the holes 22.

Filtering and coalescing subassembly E

As shown in Figs. 1, 2 and 3, the filtering and coalescing subassembly E is housed within the column section 5, this section being U-shaped in cross-section as best illustrated in Figs. 6 and 7. Formed on the upper and lower ends of the section 5 are flanges 32 and 33 for bolting it to its adjacent column sections and provided along its forward sides are stiffening ribs 34. Welded to the open face of the section 5 is a rectangular frame 35 and bolted to the outer face of the frame 35 is a rectangular frame 36. Secured to the inner face of the frame 36 is a vertically slotted rectangular plate 37 (Figs. 3 and 8) and supported by the plate 37 cantilever fashion by rods 37a is a plurality of laterally spaced vertically disposed reticulated filter leaf frames 38.

The filter leaf frames 38 are provided to perform two functions. Firstly, they remove the remainder of the solid contaminants that can be removed by filtration and, secondly, they cause the coalescing of the remaining fine liquid droplets into larger settleable droplets. The frames 38 are covered by a laminated filtering stocking 39 (Fig. 8). The outer layer of the stocking, such as burlap or sisal sheeting 41a, serves as a conventional filtering element for the retention of foreign matter, followed by a blanket of cotton linters 41 of substantial thickness, approximately between ¼ and ½ inch. Next behind the cotton linters are several layers of fine fibered material, such as glass fibers, for causing coalescing of the remaining liquid. The blanket of cotton linters and burlap is normally in compression when the unit is operating, due to the pressure of the hydrocarbon in the vessel. When the unit is shut down and the pressure is relieved, the cotton linters and burlap expand, which motion causes a shedding of the contaminant that has been deposited on the burlap sheet 41a. It is thus important to have this rather thick blanket to perform the two functions of (1) protecting the coalescing media and (2) acting as a bellows for shedding solids from the burlap sheet 41a. This technique enables the filtering element to have a longer effective life before requiring that it be replaced. When the unit is shut down the filtering element can be further cleansed by drawing down the water level in the bottom of the unit, thus causing a backflow of liquid through the filter element. This, together with the shedding action, makes a very effective long-life unit.

Welded to the interior of the section 5 and serving to more closely confine the filtering and coalescing elements above described is a series of vertically disposed false walls 44. Formed in the horizontal partition wall 17, external to the false walls 44, is a plurality of holes 45 for establishing communication between the settling chamber D (Fig. 3) and the filtering and coalescing elements.

Settling chamber F

Welded to the frame 36 is a rectangular box 46 and extending across said box adjacent its upper end is a perforated partition wall 47, that portion of said box 46 lying below the wall 47 serving as the settling chamber F. As best shown in Fig. 8 the settling chamber F has direct communication through slots 37b formed in the plate 37 with the interiors of the filtering and coalescing elements constituted by the stockings 39 so that hydrocarbon and water passing through the stockings can pass forwardly and downwardly into the settling chamber F. Attached to one of the lower corners of the chamber F and communicating therewith is a water and dirt sump 48 provided with a valve 49. Welded to and within the box 46 is a plurality of laterally spaced vertical partitions 51 formed with arched lower ends 52 for permitting water and dirt to flow laterally into the sump 48.

Second scrubber G

As shown in Figs. 3 and 8, the upper end of the box 46 lying above the perforated partition 47 serves as a container for the scrubber subassembly G. Disposed within this container is a layer or body 53 of tower packing similar to that forming the layer 13 previously described. Covering the upper end of the box 46 and welded thereto is a plate 54, the inner edge of which is bolted to the frame 36.

It will therefore be seen that the filtering and coalescing subassembly E, the settling chamber F and the scrubber subassembly G constitute an integral structural unit which can be readily removed from the column section 5 by simply removing the bolts holding the two flanges 35 and 36 together, the latter being conventionally sealed by a gasket 55.

Settling chamber H

Extending across the upper end of the U-shaped column section 5 and welded to its three sides is an inclined partition wall 56 serving as the ceiling of the subassembly E and as the floor of the subassembly H. As best shown in Fig. 3, the righthand edge 57 of the partition wall 56 is welded to the inner frame 35. Disposed immediately above the partition wall 56 but slightly spaced therefrom is a pair of laterally spaced upwardly arched baffles 58 each connected at its right hand end as viewed in Fig. 3 to a pipe 59 extending downwardly through the scrubber G and settling chamber F to the lower end of the latter. The pipes 59 are welded or otherwise secured to the bottom and top sections of the frame 36 and the baffles 58 are supported cantilever fashion from the upper ends of the pipes 59. Conveniently the baffles 58 can be made by cutting pipe sections on a diagonal thereby to form arched and tapered structures as best shown in Figs. 7 and 8. Here it should be noted that the baffles 58 and pipes 59 are formed integral with the subassemblies E, F and G and are therefore removable with these subassemblies as a unitary structure when it is desired to substitute new stockings 39 on the filter frames 38.

Desiccator subassembly J

Extending across the lower end of the column section 6 and forming the ceiling of the subassembly H and the floor of the subassembly J is a screen or perforated partition wall 61 and supported on said screen is a body 62 of a desiccating material such as sodium chloride (rock salt) through which the hydrocarbon under treatment can readily pass and in so doing be freed of its remaining water content. In addition to rock salt, other materials performing this same function may be used, such as activated alumina or ceramic thimbles or beads. Rock salt is believed to be the best, however, as it is inexpensive and readily available. In one run involving more than two million gallons of hydrocarbon, the rock salt was found to have been consumed by an almost immeasurable amount. Any consumed material may be replaced merely by adding new material to the top of the unit from time to time.

Hydraulic shock absorber K

Disposed over and sealed to the column section 6 is a dome 7 capped by a window 63 and provided with a finished product outlet part 64. The dome 7 is provided to act as a shock absorbing chamber by having contained therein a small quantity of gas under pressure. When the unit is suddenly shut down or operated intermittently with sudden shut-downs and start-ups, this dome 7 will absorb the shock and prevent the disturbance of the operation of the rest of the equipment. In addition, if there is any gas entrained with the hydrocarbon, as does occur from time to time, the gas will be entrapped in this zone and thus not delivered with the finished product. If the gas volume in the dome becomes too great, it may be bled off from time to time through a tap (not shown).

Miscellaneous

Welded to the column section 6 above box 46 is a pair of vertically aligned brackets 65 and 66 (Figs. 1 and 2) and swiveled on these brackets is rail 67. Mounted on the rail 67 is a carriage 68 and depending from the carriage 68 is a hoist hook 69 arranged to receive a block and tackle not shown for supporting the subassemblies E, F and G and their associated parts when it is desired to remove these subassemblies from the unit for the purpose of recovering the filter leaf frames.

Operation

To initiate the operation of the type of rectifier particularly described in Figs. 1, 2 and 3, the draw-off valve 4a is closed and then water is delivered to the unit through the header 8 until it has reached a level L. This having been done, the header 8 is connected with a source of the hydrocarbon to be treated.

Here it should be noted that the total combined area of the openings or orifices 11 should be equal to or greater than the cross sectional area of feed header 8 so that the hydrocarbon is delivered into the body 13 of the tower packing at a slow, non-turbulent velocity in order to avoid the multiplication of droplets. As the hydrocarbon streams past the tower packing and the water in which the tower packing is immersed, its water droplets are distorted, exposed, pinched, elongated, etc., exposing all portions of them to the water bath, causing coalescing with each other to form larger droplets. It is believed that the interfacial tension of the droplets is considerably reduced to the point where, due to this distortion, etc., the tension is overcome and the droplets blend into and become a part of the water bath.

As the hydrocarbon, free of some of its water and dirt, passes upwardly through the agglomeration or contacting zone 16, its velocity is increased and this results in bringing its water and emulsion droplets into more intimate contact with each other, whereupon some of them coalesce into larger droplets, some of which are sufficiently large to settle to the bottom of the unit along with additional foreign matter. In passing between the upper lip 21 of the agglomeration zone 16 and the lower edge of the ring 18, the hydrocarbon is further accelerated and compressed, again resulting in bringing the water, waxes and gums and emulsion droplets thereof into more intimate contact with each other to thereby agglomerate some of them and cause them to settle out in the settling chamber D and to pass through the conduits 23 and 24 into the bottom of the unit. Here it should be noted that the hydrocarbon confined within the chamber D is relatively quiescent for the reason that its volumetric capacity is greater than that of the coalescer C.

In the device shown in Figs. 1, 2, 3 and 10, with the Venturi-shaped agglomeration zone 16, it is believed that the sharp change in velocity and pressure causes considerable contact of both the solid and liquid particles and droplets, forming them into larger or longer particles and larger droplets. The solid particles resulting from this treatment have an unusually long stringy hair-like appearance, which when passing out of the agglomeration zone and into the gravity settling chamber D are caused by the rolling action present in that chamber to roll up into ball-like masses.

At this point the hydrocarbon has been freed of a considerable portion of its dirt, wax and gum content and some of its water content.

The hydrocarbon so treated then passes upwardly around the shell of the filtering and coalescing subassembly E and overflows into the interior of the shell. It then passes through the laminated filtering and coalescing stocking whereupon it is first freed of additional dirt and then a further quantity of its emulsion droplets is made to coalesce.

Here the function of the burlap sheet 41a and the blanket of cotton linters 41 is simply to filter out foreign solid material and to protect the coalescing media. The gass fiber sheet 40a serves to coalesce very tiny droplets. These droplets are sufficiently large to settle out within a relatively short time. The perforated plate 38a merely serves as a screen for supporting the filtering and coalescing sheets or blankets.

The filtrate from the subassembly E passes into the settling chamber F and there a further gravity separation takes place, the free water content thereof passing downwardly into the sump 48 and the remaining hydrocarbon rising upwardly through the body 53 of tower packing and into the quiescent settling chamber H. In passing through the tower packing some additional coalescing of water droplets takes place, the coalesced droplets settling out in the chamber H over the baffles 58. The free water so formed drains across the inclined wall or floor 56 through the conduits 59 and into the sump 48.

From the settling chamber H the hydrocarbon passes upwardly through the body 62 of desiccating material into the dome K. If the desiccating material is in the form of rock salt it will gradually be dissolved by the remaining free water content of the hydrocarbon, if any exists, and settle as a salt solution into the chamber H and through the conduits 59 into the sump 48. The presence of desiccating material further serves as insurance against the leakage of any of the earlier described operations of the apparatus. If for any reason any water by-passes any of these units, it should be removed by the desiccating material.

The finished hydrocarbon so treated, after passing through the desiccator, passes out of the unit through the outlet port 64 and at this point should be substantially free of water and foreign matter. Periodically during the operation of the unit, water and dirt can be drawn from the discharge outlet 4 so as to maintain the column of water substantially at the level L. This can be done manually or automatically by means of the interface control 26, the valve 4a and suitable operating mechanism associated with these elements, all in accordance with well known practice. Also during the continued operation of the unit, water and foreign matter can be drawn off periodically through the valve 49.

As a further feature, the line 100 connected to valve 49 may be connected to the sump 2 in order to have all the contaminants concentrated in one portion of the unit and withdrawn from a single point. The line 100 is provided with a check valve 101 and a pump 102. When the unit is operating, there will be a higher pressure in sump 2 than in sump 48. The by-passing of liquid is avoided by use of the check valve 101. The pump 102 is necessary to cause the positive flow of contaminants against this higher pressure. When the unit is shut down any residual contaminants remaining in sump 48 will travel by gravity to the sump 2.

As a result of this operation it will be seen that a progressive breaking of the emulsion droplets of the hydrocarbon takes place, the water droplets contained in the hydrocarbon being progressively coalesced into droplets of sufficient size to settle out by gravity, along with dirt and other foreign matter, the hydrocarbon so freed of a substantial portion of its foreign matter and free water then passing through the filtering elements of the subassembly E and then through its coalescing elements. Here it should be observed that by this sequence of operations the load imposed on the filtering elements of the subassembly E is materially reduced and these elements, as well as the coalescing elements of the subassembly, are protected from premature plugging or blocking. The filtrate from the subassembly may contain an additional quantity of coalesced water droplets and, if so, these are allowed to settle out as free water before the filtrate is placed in contact with the desiccator so as to relieve the load placed thereon. In short, the various elements of the unit are arranged so that the operation of the unit can be continued for relatively long periods without the necessity of a shut-down for either replacing the filtering and coalescing elements or renewing the desiccating material. As a matter of fact, tests indicate that a unit of this character operating on gasoline received from a barge will have a capacity of 6,000,000 gallons or more before any shut-down is required. This unit will have an overall column height of 18′3″, a diameter of 5′ and a filtering and coalescing area of 500 sq. ft. At a rate of about 1000 g.p.m. tests showed that no additives were removed. New filter and coalescer stockings can be easily installed for all of the work required can be done outside of the unit. Furthermore, dirt build-up in the unit around the stockings can be washed out with a water hose.

In operation the pressure drop through the unit is low at the start-up and for most of the run but at the end of the run there is a sharp increase in pressure drop up to a maximum of 25 p.s.i. All interior surfaces following the coalescer subassembly were protective coated with plastic paint to insure a clear end product.

Figs. 10 and 11 show a special operation of the apparatus adapted for removal of the solid and liquid contaminants. It has been found that a rather sharp change in pressure and velocity will cause a contacting or agglomeration of the contaminants. In these figures two types of devices for accomplishing this rapid change in velocity and pressure are shown, the device shown in Fig. 10 being the preferred embodiment. In addition to the contacting action accomplished by the device shown in these figures, if the waxes and gums have been previously scrubbed in a manner heretofore described, a further increase in efficiency in contacting will be observed.

It should be noted that this device, together with the scrubbing device, is extremely efficient for the removal of a very difficultly removable substance—namely, the waxes and gums. It is believed that fine solid particles, usually iron oxide, from the vessel, pipes or pumps and with a diameter of from 3 to 5 microns, gather about them a volume of wax or gum because they act as nuclei to which the wax or gum adheres. The resulting particles reach rather large proportions, believed to be in the order of 8 to 10 microns. Despite this size they will nevertheless pass through a filter designed to stop particles of this size by simply becoming long thread-like extrusions small enough to pass through. If a filter is designed to be fine enough to stop these particles, it will quickly clog up or blind and become sealed off. With this invention much of these wax and gum-like particles are removed not by a direct filtration but rather by a scraping, contacting action forming them into larger particles that will settle by gravity with the water contaminant.

I claim:

1. A hydrocarbon rectifier comprising a cylindrical container including a dished bottom and a cover sealed thereto; a header mounted in said container intermediate its top and bottom and provided with upwardly extending spray nozzles, said header having communication through said container with an external source of hydrocarbon to be treated and said dished bottom being provided with a drainage outlet; an upright truncated cone connected at its lower end to the side walls of said container above said header and forming an annular first settling chamber with the side walls of said container, the upper end of said truncated cone terminating at a point substantially below the top of said container; a downwardly extending ring connected along its upper periphery to said cover, said ring having a diameter substantially greater than the diameter of the upper end of said truncated cone and substantially less than the diameter of said cylindrical container; a conduit establishing communication between the lower end of said settling chamber and the dished bottom of said container; a body of tower packing extending across said container over said header and below the lower end of said truncated cone; a filter casing mounted on the said cover of said container; a conduit connecting the upper end of said settling chamber with the interior of said filter casing; a filter mounted within said filter casing; a second settling chamber arranged to receive the filtrate from said filter; and a finished product outlet communicating with the upper end of said second settling chamber.

2. A hydrocarbon rectifier such as defined in claim 1 wherein a third settling chamber is mounted above said filter casing and communicates with said second settling chamber through a second body of tower packing extending across the upper end of said second settling chamber and wherein said finished product outlet communicates with said third settling chamber through a body of desiccating material accommodated in a second container mounted on and supported by said third settling chamber.

3. A hydrocarbon rectifier comprising a cylindrical container including a dished bottom and a cover sealed thereto; a header mounted in said container intermediate its top and bottom and provided with upwardly extending spray nozzles, said header having communication through said container with an external source of hydrocarbon to be treated and said dished bottom being provided with a drainage outlet; an upright truncated cone connected at its lower end to the side walls of said container above said header and forming an annular first settling chamber with the side walls of said container, the upper end of said truncated cone terminating at a point substantially below the top of said container; a downwardly extending ring connected along its upper periphery to said cover, said ring having a diameter substantially greater than the diameter of the upper end of said truncated cone and substantially less than the diameter of said cylindrical container; a conduit establishing communication between the lower end of said settling chamber and the dished bottom of said container; a body of tower packing extending across said container over said header and below the lower end of said truncated cone; a filter casing adjacent said container; a conduit connecting the upper end of said settling chamber with the interior of said filter casing; a filter mounted within said filter casing; a second settling chamber arranged to receive the filtrate from said filter; and a finished product outlet communicating with the upper end of said second settling chamber.

4. A hydrocarbon rectifier such as defined in claim 3 wherein a third settling chamber communicates with said second settling chamber through a second body of tower packing extending across the upper end of said second settling chamber and wherein said finished product outlet communicates with said third settling chamber through a body of dessicating material within a second container adjacent said third settling chamber.

5. A hydrocarbon rectifier, comprising a closed container having a first chamber, a second chamber adjacent to said first chamber and in hydraulic communication with the upper portion of said first chamber; a header mounted in said first chamber intermediate its top and bottom and provided with fluid distribution means, said header having communication through said container with an external source of hydrocarbon to be treated, a drainage outlet in the bottom of said first chamber, an upright truncated cone connected at its lower end to the side walls of said first chamber above said header and forming an annular settling chamber with the side walls of said first chamber, the upper end of said truncated cone terminating at an elevation substantially below the top of said first chamber, an inverted cup-like member mounted in the upper portion of said first chamber and having sidewalls extending downwardly at least to the elevation of the upper terminal end of said truncated cone, said cup-like member having a diameter substantially greater than the diameter of the upper end of said truncated cone and substantially less than the base of said truncated cone, a discharge outlet in the bottom of said annular settling chamber enabling removal of settled impurities therefrom, means enabling the supply of water to said first chamber to maintain said header immersed in water therein, filtering and coalescing means mounted in said second chamber to receive effluent from the upper portion of said first chamber, a first discharge means in the lower portion of said second chamber enabling removal of impurities separated therein, and a product discharge means enabling removal of effluent from the said filtering and coalescing means of said second settling chamber at an elevation above said first discharge means of said second chamber.

References Cited in the file of this patent

UNITED STATES PATENTS

| | | |
|---|---|---|
| 1,005,977 | Jones | Oct. 17, 1911 |
| 1,405,126 | Harris | Jan. 31, 1922 |
| 1,440,832 | Jones | Jan. 2, 1923 |
| 1,448,593 | Jaworski | Mar. 13, 1923 |
| 1,530,077 | Haynes | Mar. 17, 1925 |
| 1,607,898 | Lindsay | Nov. 23, 1926 |
| 1,635,845 | Holford | July 12, 1927 |
| 1,649,103 | Egloff et al. | Nov. 15, 1927 |
| 1,720,604 | MacLeod | July 9, 1929 |
| 1,932,525 | Jacobson et al. | Oct. 31, 1933 |
| 1,947,709 | Garrison et al. | Feb. 20, 1934 |
| 1,956,997 | Read | May 1, 1934 |
| 2,073,026 | Renfrew et al. | Mar. 9, 1937 |
| 2,165,703 | Holmes | July 11, 1939 |
| 2,219,101 | Finwall | Oct. 22, 1940 |
| 2,323,876 | Rickett | July 6, 1943 |
| 2,421,375 | Elliott | June 3, 1947 |